United States Patent [19]

Fallon et al.

[11] Patent Number: 4,484,695
[45] Date of Patent: Nov. 27, 1984

[54] SAFETY PRESSURE REDUCING REGULATOR

[75] Inventors: Merton R. Fallon, Thousand Oaks, Calif.; Thomas W. Clements, Ambler, Pa.

[73] Assignee: Draft Systems, Inc., Northridge, Calif.

[21] Appl. No.: 416,476

[22] Filed: Sep. 10, 1982

Related U.S. Application Data

[63] Continuation-in-part of Ser. No. 119,561, Feb. 7, 1980, Pat. No. 4,349,136.

[51] Int. Cl.³ .......................... G01L 19/12; B67D 1/12
[52] U.S. Cl. .................................. 222/23; 137/505.25; 137/551; 137/881; 222/396; 222/397; 222/400.7
[58] Field of Search .......................... 116/70, 112, 266; 137/116.3, 467, 505.11, 505.12, 505.25, 505.26, 505.38, 505.39, 505.40, 505.41, 505.42, 505.43, 551, 854, 881; 222/3, 4, 23, 394, 396, 397, 400.7

[56] References Cited

U.S. PATENT DOCUMENTS

| | | | |
|---|---|---|---|
| 1,088,817 | 3/1914 | Graham | 116/70 X |
| 2,770,252 | 11/1956 | Bass, Sr. | 137/550 X |
| 3,144,171 | 8/1964 | Gagnan et al. | 222/3 |
| 3,250,288 | 5/1966 | Hammon | 137/116.3 |
| 4,171,004 | 10/1979 | Cerrato et al. | 137/116.5 X |

*Primary Examiner*—Charles A. Marmor
*Assistant Examiner*—Laurence J. Miller
*Attorney, Agent, or Firm*—James E. Brunton

[57] ABSTRACT

A safety pressure reducing regulator for use in systems operable by pressurized gas incorporates multiple safety features which preclude excessive pressure buildup in the system and provide protection against catastrophic failures. The regulator includes primary and secondary regulator stages through which pressurized gas from a gas pressure source is supplied to a pressure control chamber which provides the operating pressure for the system. The primary regulator stage is designed to reduce the inlet gas pressure to an intermediate level. The secondary regulator stage is designed to automatically regulate the supply of the pressurized gas at the intermediate pressure to the pressure control chamber to maintain a desired operating pressure therein. A flexible diaphragm is normally disposed across the pressure control chamber which is adapted to function as a check valve to control communication between the secondary regulator stage and the pressure control chamber. A clamping piston provided with a central passage normally clamps the flexible diaphragm in place across the pressure control chamber. In the event of excess pressure buildup in the pressure control chamber, the piston unclamps the diaphragm which collapses into its central passage to permit the pressurized gas to escape through exhaust vents. One form of the apparatus of the invention includes a unique safety feature which precludes adjustment of the secondary regulator stage until the source pressure has either been removed or relieved. Another form of the apparatus of the invention comprises a novel gage assembly also embodying the collapsible diaphragm element.

5 Claims, 4 Drawing Figures

SAFETY PRESSURE REDUCING REGULATOR

BACKGROUND OF THE INVENTION

This is a continuation-in-part application of copending application Ser. No. 06/119,561 filed Feb. 7, 1980, now U.S. Pat. No. 4,349,136 issued Sept. 14, 1982.

The present invention relates to a pressure reducing regulator for use in systems operable by pressurized gas, and, more particularly, to an improved safety pressure reducing and regulating device which maintains a desired operating pressure in the system and provides protection against catastrophic failures.

The present invention provides a safety pressure reducing regulator for a fail-safe gage assembly for use with beverage dispensing equipment utilizing a pressurized gas source which reduces the gas pressure of the source to a desired level for dispensing operations and provides safeguards against possible injury and death in the event of failure of the pressure regulator. One form of the present invention comprises a fail-safe pressure reducing regulator suitable for use with pressure sources containing high pressure compressed gases or highly compressed liquids which gasify at the time of pressure reduction. Another form of the invention comprises a fail-safe gage assembly suitable for use in various types of gas pressurization systems.

Typically, in a dispensing system for drawing liquids, such as beer or soda, from containers, such as beer kegs or barrels, a source of pressurized gas is employed to pressurize the liquid contents of the container. The gas pressure source is usually coupled to the container via a pressure regulator which is intended to reduce the high gas pressure from the source to a suitable pressure level for operation of the dispensing system. For example, U.S. Pat. No. 3,848,631, assigned to the common assignee herewith, discloses a pressure regulator which provides protection against over pressurization of the container beyond safe limits. Other types of pressure regulating devices are disclosed in U.S. Pat. Nos. 2,195,728; 2,642,701; 2,770,252; 2,816,561; 2,891,569; and 3,088,486. U.S. Pat. No. 3,190,496 shows a diaphragm meter valve.

Generally, the prior art devices have been susceptable to failure in operation and have not provided complete protection against over-pressurization which frequently results in serious injury or death to persons in the immediate area when an explosion occurs. Some of the current devices employed perform the desired pressure reduction and regulation in a single stage which leads to extremely dangerous situations when the devices fail. In addition, the current devices generally do not employ adequate reverse flow check valves or systems to preclude the contamination of the regulator mechanism by reverse flow of gas or liquid through the device at the time it is disconnected from the pressure source. Moreover, the devices generally allow free interchange of various gauges, shut-off valves, pressure hoses and other types of fittings at the various high pressure and low pressure ports of the devices. Thus, it is possible for mistakes to occur in the installation of such devices with accompanying malfunctions and dangers.

Safety is a major concern in the installation and operation of pressure reducing and regulating devices. Avoidance of catastrophic failures is absolutely essential because such failures can result in serious personal injury and even death of persons in the immediate area of the equipment. Experience has shown that nearly all catastrophic failures of pressure regulating devices in the prior art are the result of contamination, or the absence or malfunction of reverse flow check valves in the equipment. The devices are also susceptible to malfunctions resulting from tampering by inexperienced or qualified personnel with the intended operation of the devices. In addition, failures due to normal wear can become catastrophic because of the inadequate safety considerations in the design of the equipment.

SUMMARY OF THE INVENTION

One embodiment of the present invention comprises a pressure regulator device which is characterized by enhanced safety features over the prior art. The device is designed to achieve pressure reduction in two separate stages and to accurately maintain a desired operating pressure at its outlet. The pressure regulator is also adapted to provide effective protection against overpressurization to preclude catastrophic failures. This protection is achieved by use of a collapsible diaphragm which normally serves as a seal for a pressure control chamber in the regulator device and is adapted to collapse in response to excess pressure and release the pressurized gas harmlessly through exhaust vents. The two-stage pressure reduction is accomplished by a primary regulator stage which receives pressurized gas from the source and reduces the gas pressure to an intermediate level and a secondary regulator stage which is adapted to selectively provide communication between the primary regulator stage and the pressure control chamber to maintain a desired gas pressure in the control chamber which is supplied to a dispensing system. The secondary regulator stage is adjustable to selectively vary the outlet pressure in the pressure control chamber. The flexible diaphragm is normally clamped across the pressure control chamber by a suitable piston which engages the diaphragm at its periphery. In response to excess pressure in the pressure control chamber, the piston is moved out of clamping engagement with the diaphragm to allow the diaphragm to collapse and release the pressurized gas through the exhaust vents. The piston includes a central passage through which the pressurized gas escapes from the pressure control chamber through the exhaust vents provided in the regulator housing.

The thrust of one form of the invention of the present continuation-in-part application is to provide yet another unique safety feature which precludes adjustment of the secondary regulator stage until the source pressure has either been removed or relieved. This is accomplished by providing means for sensing and safely relieving any pressure which may exist in the primary stage at the time initial steps are taken to accomplish adjustment of the secondary regulator stage.

Another form of the invention of the present continuation-in-part application comprises a unique gage assembly also embodying a collapsible diaphragm element. The component parts of this latter form of the invention are similar to the parts of the pressure regulator device described in the preceeding paragraphs. The basic difference is that in the gage assembly the collapsible diaphragm is not used as a sensing-regulating element within the regulator body, but rather is used as a sensing-indicating element of the unique gage assembly. As will be discussed in greater detail hereinafter, in this latter form of the invention the collapsible diaphragm is installed and secured within a pressure chamber by a clamping means similar to that used in the pressure regulator and the gas pressure is exposed to one side of the diaphragm through an inlet means which also comprises the gage port of the pressure chamber. The collapsible diaphragm is operably associated with a pressure indicator of display in such a fashion that motion of the diaphragm is translated by suitable means to provide an indication of the level of pressure applied. However, the clamping means is constructed and arranged so that the diaphragm will collapse at a predetermined pressure level, as for example, 10 percent above the maximum of the working range of the gage, thereby safely venting the gas to atmosphere in the event of over pressurization of the system.

Considering first the improved pressure regulator of the invention, the regulator is principally designed for use with high pressure gas sources which are used to dispense carbonated beverages, e.g., beer or soda. The gas pressure source normally contains liquid carbon dioxide, which exists at a pressure dependent upon its storage temperature, but is normally between 800 and 1000 pounds per square inch (psi). Generally, no carbonated beverages are ever dispensed at pressures in excess of 100 psi. Typically, beer is dispensed at a pressure of 15 psi and carbonated soda at a pressure between 80 and 90 psi. A conventional beer keg is normally designed to withstand internal pressure between 140 and 150 psi.

The improved pressure regulator of the present invention advantageously employs a primary regulator stage which is nonadjustable and provides a limit on the inlet pressure of 110 psi. This nonadjustable feature precludes tampering with the pressure regulator and precludes application of higher input pressures to the dispensing system. The pressure regulator incorporates a secondary regulator stage which further reduces the gas pressure to the range actually required to dispense beverages. The desired range falls within 12-20 psi for beer and between 12-100 psi for nonalcoholic beverages and carbonated soda. The secondary regulator stage is similar in design to the pressure control mechanism disclosed in U.S. Pat. No. 3,848,631. This pressure control mechanism has the advantage that it is normally closed by the pressure in the beverage container. Thus, any failure which might possibly occur, would usually happen with the secondary regulator stage closed. However, in the event that failure occurs with the secondary regulator stage in its open condition, its pressure control mechanism is designed to freeze itself shut almost instantaneously. Further safety is provided by the collapsible diaphragm in the pressure control chamber which collapses in response to excess pressure and rapidly releases the pressurized gas from the pressure control chamber through the exhaust vents.

The pressure regulator incorporates another extremely important safety feature in the adjustment mechanism employed for the secondary regulator stage. The adjustment mechanism requires that the gas pressure source be shut off and that the pressure regulator be partially disassembled to gain access to the adjustment mechanism. This requirement precludes the danger which arises in prior art systems when the pressure from the source diminishes as the pressurized gas is depleted therefrom. Typically, in the operation of prior art systems, the readily available pressure adjustment on the gas pressure source is turned up until all of the available gas pressure is completely exhausted. Thus, with inexperienced operators, this type of operation results in the pressure regulator in its fully open or maximum pressure condition when the gas pressure source is exhausted. At this time, the inexperienced operator usually discovers that the pressurized gas has been depleted and removes the fully open pressure regulator from the depleted gas source and reinstalls it at its maximum pressure setting on a replacement source which is fully pressurized. If the fully pressurized source is opened without changing the maximum pressure setting of the regulator, a catastrophically dangerous situation arises when the maximum pressure is applied to the beverage container. Frequent fatalities have resulted in situations where this precise sequence of steps was followed. This danger is completely precluded by the pressure regulator of this invention because adjustment of the pressure regulator can only be made by trained personnel equipped with special tools to make the necessary adjustment.

The present invention provides a novel and improved pressure regulator for use in beverage dispensing systems which overcomes or minimizes the problems associated with the prior art devices as set forth above and provides a pressure regulator device which (1) precludes over-pressurization of the beverage container or vessel, (2) incorporates a two-stage pressure reducing system to safely reduce the high gas pressure from the source to the desired operating pressure for the vessel, (3) automatically regulates the pressure in the vessel to maintain the desired pressure therein regardless of the level of pressure supplied to the regulator, (4) precludes undesirable reverse flow of pressurized fluid, either gas or liquid, contents from the beverage container through the pressure regulator, (5) precludes excess pressure buildup in the beverage container by allowing any excess pressure to rapidly escape through exhaust vents, and (6) includes a further safety feature which precludes adjustment of the secondary regulator stage until the source pressure has either been removed or relieved.

In accordance with one form of the invention, a pressure regulator for disposition between a gas pressure source and a pressure vessel comprises a housing provided with a pressure chamber therein and one or more vents to release excess pressure from the pressure chamber, inlet means for supplying pressurized gas from the gas pressure source to the pressure chamber, outlet means in communication with the pressure chamber for supplying the pressurized gas to the pressure vessel, a flexible diaphragm disposed within the housing for normally sealing the pressure chamber from communication with the vents, and clamping means disposed within the housing and adapted to normally clamp the diaphragm across the pressure chamber to block communication with the vents, the clamping means being actuatable in response to excess pressure in the pressure chamber to unclamp the diaphragm and allow the diaphragm to collapse and permit gas to escape from the pressure chamber through the vents. Preferably, the clamping means is embodied as a clamping piston slidably disposed within the housing and provided with a central passage in communication with the vents, the piston being adapted to clamp the diaphragm at its periphery and retain the diaphragm in place over the central passage to preclude gas flow therethrough, and bias means for normally urging the piston into clamping engagement with the diaphragm, the piston being movable against the action of the bias means upon an increase of the gas pressure in the pressure chamber above a predetermined level to unclamp the diaphragm and allow the diaphragm to collapse into the central passage to permit the gas to escape from the pressure chamber through the vents.

The improved form of the pressure regulator of the invention includes a primary regulator stage for receiving pressurized gas from the gas pressure source and reducing the gas pressure to an intermediate level, and a secondary regulator stage adapted to selectively provide communication between the first regulator stage and the pressure chamber for maintaining a desired gas pressure therein. The primary and secondary regulator stages include corresponding primary and secondary chambers which are interconnected by a passage formed in the housing. The pressurized gas from the gas pressure source is supplied to the primary chamber which is provided with a diaphragm-operated poppet valve to control the entry of the pressurized gas into the chamber. In addition, a diaphragm-controlled relief valve is provided to prevent excess pressure buildup in the primary chamber.

The secondary regulator stage includes an inlet member slidably mounted within the housing which extends from the secondary chamber through the central passage in the clamping piston to the pressure control chamber and sealing means located in the secondary chamber in a position to engage the inlet member to block gas flow into the pressure control chamber. The inlet member is responsive to the gas pressure in the pressure control chamber to move out of engagement with the sealing means when the gas pressure in the pressure control chamber drops below a predetermined level to supply pressurized gas thereto and to move into engagement with the sealing means when the gas pressure in the pressure control chamber increases to the predetermined level to block the gas flow into the pressure control chamber.

The secondary regulator stage is provided with adjustable bias means to vary the pressure required in the pressure control chamber to move the inlet member into engagement with the sealing means. In addition, a pressure regulator piston is mounted on the inlet member and is provided with a central opening for gas flow from the inlet member into the pressure control chamber. The diaphragm is disposed across the central opening in the pressure regulator piston and adapted to function as a check valve to permit forward flow of pressurized gas from the inlet member into the pressure control chamber and to block reverse flow. The pressure regulator is disposed within the central passage of the clamping piston and both pistons are spaced apart to provide an annular space therebetween into which the diaphragm is collapsible to release excess pressure from the pressure control chamber.

Accordingly, it is a primary object of the present invention to provide a pressure reducing regulator for use in systems operable by pressurized gas which safely and effectively achieves pressure reduction and regulation.

It is also an object of the invention to provide an improved safety pressure regulator which automatically allows excess pressure to escape to avoid catastrophic failure of a dispensing system.

Another object of the invention is to provide an improved pressure regulator which achieves pressure reduction in two stages and automatically maintains a desired output pressure in the dispensing system.

It is another object of the invention to provide a pressure reducing regulator with enhanced safety features which minimize the possibility of malfunctions which result in catastrophic failures in the system.

It is a further object of the invention to provide a safety pressure reducing regulator which is purposely designed to require attention by experienced personnel to minimize the possibility of damage to the equipment and injury to inexperienced operators.

It is another object of the invention to provide a pressure relief means which precludes adjustment of the secondary regulator stage of the device until the source pressure has been removed or relieved.

It is yet another object of the invention to provide a novel gage assembly, including pressure indicating means, for use in pressurization systems in which any over pressurization of the system above a predetermined level beyond the maximum display pressure range of the pressure indicating means will result in the automatic venting of the system to atmosphere.

It is still another object of the invention to provide a gage assembly of the aforementioned character in which, following automatic venting, the pressurization system embodying the gage assembly must be completely shut down to enable corrective or restorative action.

BRIEF DESCRIPTION OF THE DRAWINGS

The objects and advantages of the present invention will become more apparent upon reference to the following specification and accompanying drawing, wherein.

DETAILED DESCRIPTION OF THE IMPROVED APPARATUS OF THE INVENTION

Figure 1:
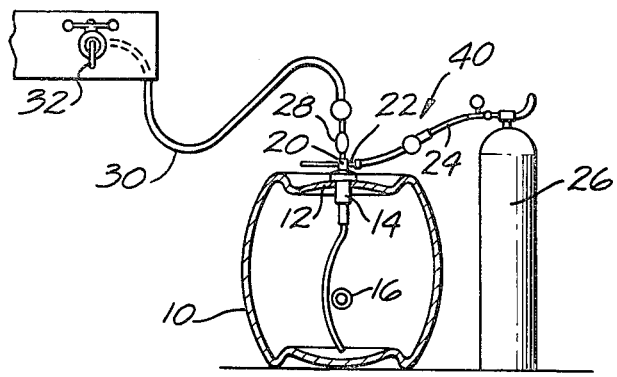
FIG. 1 is a schematic view illustrating a beverage dispensing system which employs a pressure reducing regulator constructed in accordance with the present invention in the gas supply line between a gas pressure source and a beverage container.

Referring to FIG. 1, there is schematically illustrated a beverage container 10, e.g. a conventional beer keg, provided with an opening in its top wall 12 for receiving a keg adapter 14 which is semi-permanently installed in the keg. A normally closed opening 16 is formed in the side wall of the keg. A coupler unit 20 is connected to keg adapter 14 to form a keg tapping unit. For example, the type of keg tapping device disclosed in U.S. Pat. No. 3,422,488, which is assigned to the common assignee herewith, may be employed. Coupler unit 20 includes a gas inlet port 22 provided with a fitting adapted to receive the end of a gas supply line 24 which is connected to a gas pressure source 26, e.g., a bottle of carbon dioxide. Coupler unit 20 also includes a fitting 28 adapted to receive the end of a flexible hose 30 through which the beverage is conveyed from vessel 10 to a conventional faucet 32. A pressure reducing regulator, generally 40, is disposed in gas supply line 24 which receives pressurized gas from source 26 and supplies a reduced gas pressure to the interior of vessel 10. The pressurized gas in the vessel drives the beverage outwardly through the tapping device and beverage supply line 30 for dispensing from faucet 32.

Figure 2:
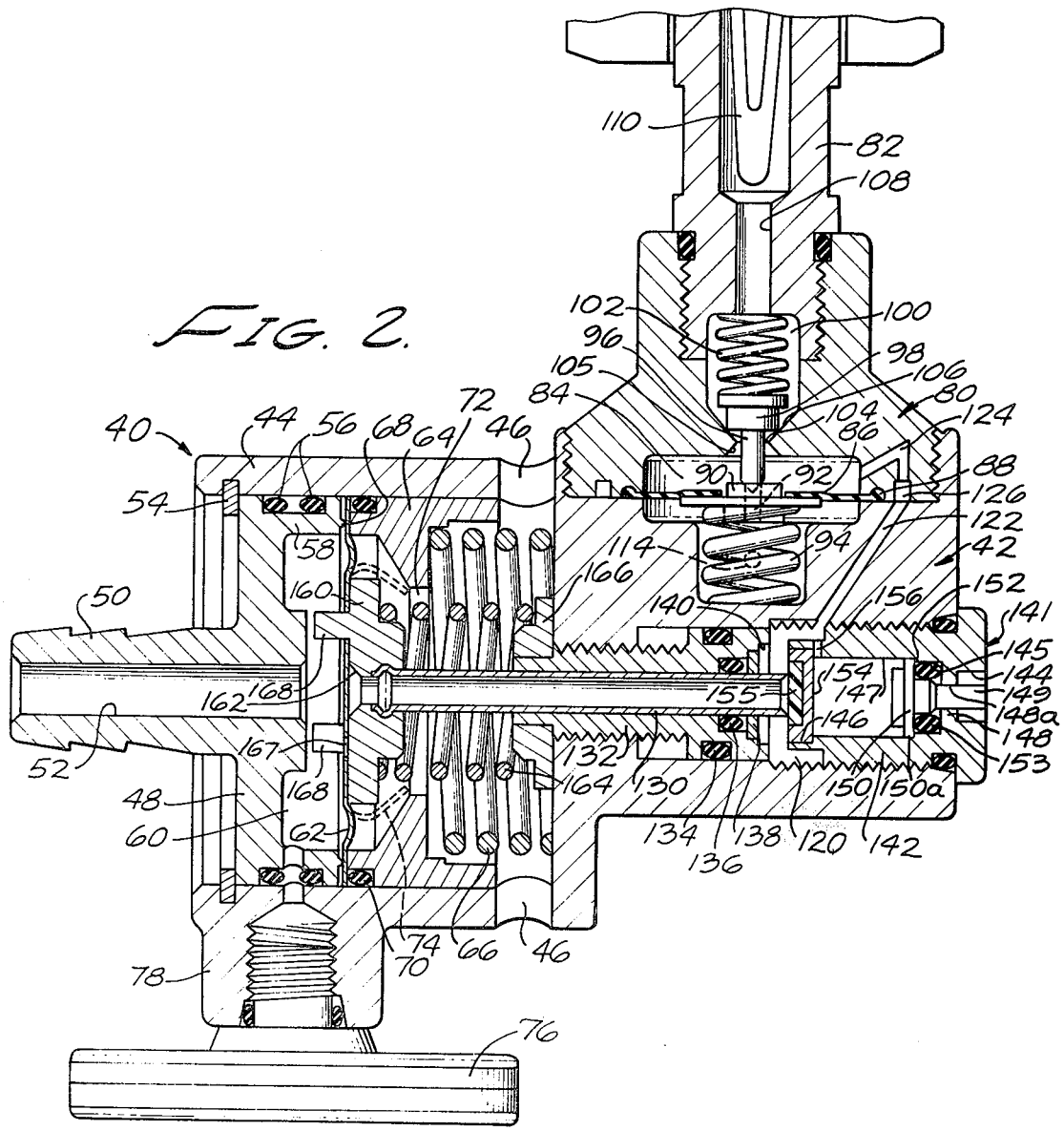
FIG. 2 is an enlarged longitudinal cross-section of the present reducing regulator.

As shown in FIG. 2, pressure regulator 40 includes a regulator housing comprising a pressure inlet section 42 and a pressure outlet section 44. The outlet section of the regulator housing is generally cylindrical and hollow in configuration and provided with a set of exhaust vents 46. An outlet fitting 48 including an outwardly projecting nipple 50 provided with an axial passage 52 is received within cylindrical housing section 44 and held in place by a retainer ring 54 which is snap fit into a corresponding annular groove provided in the housing. A pair of O-ring seals 56 are mounted in a peripheral groove provided in outlet fitting 48 to provide a gas-tight seal between the outlet fitting and the interior wall of the housing. An inwardly projecting annular flange 58 is provided on outlet fitting 48 which defines a pressure control chamber 60 in communication with outlet passage 52.

A flexible diaphragm 62, preferably consisting of soft, elastomeric material, is disposed transversely within housing section 44 adjacent to annular flange 58 of the outlet fitting. Diaphragm 62 is circular in configuration and normally disposed across pressure control chamber 60 to seal the pressure control chamber from communication with exhaust vents 46. A cylindrically shaped clamping piston 64 is slidably disposed within housing section 44 and is normally biased by a compression spring 66 into engagement with the periphery of flexible diaphragm 62 to clamp the diaphragm against annular flange 58 in its normal position across pressure control chamber 60. A raised, annular ridge 68 is formed on the inner face of annular flange 58 to assist clamping piston 64 in firmly retaining flexible diaphragm 62 in place. Annular ridge 68 serves as a high pressure seal and firmly grips diaphragm 62 in response to the force exerted by compression spring 66. An O-ring seal 70 is mounted in a peripheral notch provided in clamping piston 64 to provide a gas-tight seal between the piston and regulator housing. Clamping piston 64 is hollow in configuration and provided with a central passage 72 in communication with exhaust vents 46.

Normally, clamping piston 64 under the action of compression spring 66 firmly clamps flexible diaphragm 62 across pressure control chamber 60 to block communication with exhaust vents 46. However, in the event of a malfunction which results in excess pressure buildup in pressure control chamber 60, a force is exerted on diaphragm 62 and transmitted to piston 64 which is sufficient to overcome the force of compression spring 66 and move the clamping piston backward to unclamp the diaphragm. The excess pressure initially acts on an annular portion of diaphragm 62 and piston 64 limited by ridge 68. However, once piston 64 is slightly moved, the excess pressure leaks across ridge 68 and acts on the entire piston face to rapidly disengage the piston from the diaphragm. Consequently, as shown in FIG. 2, a peripheral portion 74 of diaphragm 62 is allowed to collapse into central passage 72 to permit pressurized gas to escape from pressure control chamber 60 through exhaust vents 46. In the case of toxic or flammable gas, suitable conduits (not shown) may be connected to vents 46 to direct the gas to a safe disposal area. A pressure gauge 76 is threadably mounted in a flange 78 on housing section 44 in communication with pressure control chamber 60 to permit an operator to monitor the outlet pressure.

Pressure reducing regulator 40 includes a two-stage pressure reduction system for reducing the inlet pressure supplied from gas pressure source 26 to a desired pressure in pressure control chamber 60. As shown in FIG. 2, inlet section 42 of the regulator housing includes a threaded opening which is adapted to receive a threaded valve fitting 80 which, in turn, is adapted to threadably receive a fitting 82 for coupling the inlet gas pressure hose to the regulator. Inlet section 42 of the regulator housing and valve fitting 80 include interior, hollow portions which define a primary inlet chamber 84 for receiving pressurized gas from the source. A flexible diaphragm 86 is clamped between inlet housing section 42 and adapter fitting 80 and extends across primary inlet chamber 84. Diaphragm 86 includes an enlarged peripheral rim 88 which is anchored in a corresponding groove provided in the face of adapter fitting 80. A valve seat member 90 is secured to flexible diaphragm 86 and extends through a central opening provided in the diaphragm. The valve seat member includes a central bore 92 which provides communication between the portions of primary inlet chamber 84 which are separated by diaphragm 86. A compression spring 94 is mounted in a recess provided in inlet housing section 42 for biasing valve seat member 90 into engagement with a stem 96 on a poppet valve member 98 which is located within a valve chamber 100 provided by suitable hollow openings formed in valve fitting 80 and inlet fitting 82. A compression spring 102 is located within valve chamber 100 to normally bias poppet valve member 98 downward with its stem 96 engaged with valve seat member 90 to close valve opening 92. Valve stem 96 extends through a restricted central opening 104 formed in valve fitting 80 which provides communication between chambers 84 and 100. Opening 104 includes an outwardly flared portion 105 to facilitate gas flow into chamber 84.

Poppet valve 98 is adapted to engage a tapered valve seat 106 formed on valve fitting 80 at the lower end of valve chamber 100 to control the entry of pressurized gas into primary inlet chamber 84. Inlet fitting 82 includes an axial passage 108 through which pressurized gas is supplied to valve chamber 100. A filter 110 is mounted within axial passage 108 for eliminating undesired particles or other contamination from the pressurized gas supplied by the gas pressure source.

In the primary regulator stage, compression springs 94 and 102 are designed to provide a force balanced system in which the combined action of the springs serve to normally maintain valve stem 96 engaged with valve seat member 90 to close valve opening 92 and to lift poppet valve member 98 out of engagement with valve seat 106 to allow pressurized gas to flow from valve chamber 100 through restricted passage 104 into primary inlet chamber 84.

When the gas pressure in chamber 84 reaches a predetermined level, e.g., 110 psi, diaphragm 86 and valve seat member 90 are moved against the bias of compression spring 94 to allow poppet valve 98 to engage valve seat 106 to block entry of pressurized gas into the chamber. Normally, when the gas pressure drops below the predetermined level, poppet valve 98 is opened to resume the flow of pressurized gas into chamber 84. However, in the event of an excess pressure buildup in the outer portion of primary inlet chamber 84, diaphragm 86 and valve seat member 90 are moved against the bias of compression spring 94 to separate the valve seat member from valve stem 96 with poppet valve 98 in engagement with valve seat 106. As a result, valve opening 92 is uncovered to allow pressurized gas from the outer portion of primary inlet chamber 84 to escape through vent(s) 114. Simultaneously, poppet valve 98 closes passage 104 to preclude further supply of pressurized gas from valve chamber 100 into primary inlet chamber 84. When the pressure in the primary inlet chamber drops to its desired level, compression spring 94 returns valve seat member 90 into engagement with valve stem 96 and lifts poppet valve 98 out of engagement with valve seat 106 to permit the flow of pressurized gas into the primary inlet chamber to be resumed.

Pressure reducing regulator 40 also includes a secondary regulator stage located in a secondary inlet chamber 120 formed by a longitudinal bore provided in inlet housing section 42. Pressurized gas is supplied to secondary inlet chamber 120 via a passageway 122 formed in housing section 42 which communicates with primary inlet chamber 84 via a passageway 124 and annular groove 126 formed in valve fitting 80.

A tubular inlet member 130 is slidably mounted in a hollow, cylindrical support member 132 which is threadably mounted in a threaded opening in the regulator housing which extends between secondary inlet chamber 120 and the hollow interior of outlet housing section 44. An O-ring seal 134 is located in a peripheral groove formed in cylindrical support member 132 to provide a gas-tight seal between the support member and regulator housing. In addition, O-ring seal 136 is located in an annular recess formed in support member 132 and held in place by a snap ring 138 to provide a gas-tight seal between the cylindrical support member and tubular inlet member 130. Preferably, cylindrical support member 132 includes a socket-like opening 140 which is adapted to receive a specially designed adjustment tool (not shown) to allow the axial position of the support member to be adjusted to selectively vary the outlet pressure in the control chamber. A removable plug assembly 141, including a plug 142, is threadably received in inlet housing section 42 to seal secondary inlet chamber 120. This plug assembly which comprises the safety means of the invention, is of unique design and constitutes an important part of the improved pressure reducing regulator of the present invention. As will presently be described, the design of plug assembly 141 is such that adjustment of the axial position of the support member, or adjustment means, cannot be accomplished until the source pressure has either been removed or relieved.

Referring to FIG. 2, plug 142 can be seen to include a socket-like recess, or aperture 144, which is adapted to receive a conventional hex wrench to permit removal of the plug when it is desired to adjust the adjustment means comprising tubular support member 132. Additionally, plug 142 is counterbored to define three contiguous chambers, namely an outer cylindrically shaped chamber 145, an inner cylindrically shaped chamber 146 and an intermediate cylindrically shaped pressure chamber 147. The wall 148 located between the bottom of socket-like recess 144 and outer chamber 145 is provided with a bore 148a adapted to closely receive the stem portion 149 of a valve means, or element 150, which element is designed to move longitudinally within chamber 147. The valve means of this form of the invention also includes a body, or flange portion 150a the outer periphery of which is normally maintained in engagement with a shoulder 152 formed at the juncture of chambers 145 and 147. Disposed within chamber 145 is a sealing means provided in the form of an O-ring 153 which sealably engages flange 150a of the valve element and functions to prevent the flow of gas from pressure chamber 147 to atmosphere through bore 148a when the valve is in its normally closed position. Disposed within inner chamber 146 is a retainer element 154 adapted to carry an elastomeric valve element 155 for engagement with the tubular inlet member 130. When plug 142 is in place within the assemblage, valve element 155 blocks the flow of gas from secondary inlet chamber 120 into the inlet member. Chamber 147 of plug 142 is in communication with pressure chamber 120 by means of passageway 156 so that whenever chamber 120 is pressurized, chamber 147 is similarly pressurized.

With the construction thus described, adjustment of the axial position of support member 132 and, therefore, variance of the outlet pressure in the control chamber, is effectively precluded until the source pressure to the device is either removed or relieved. As seen in FIG. 2, removal of plug 142 can be accomplished only through insertion of the appropriate removal tool into the socket-like aperture 144. However, because of the positioning of valve element 150, the removal tool cannot be inserted into aperture 144 without forcing stem 149 of valve element inwardly. This, in turn, causes axial displacement of the flange portion 150a of the valve element within chamber 147 thus permitting gas under pressure within chamber 147 to automatically vent to atmosphere past O-ring 153 and through bore 148a. This outward flow of gas will at once signal the operator to remove source pressure to the regulator before attempting removal of plug 142. Once the source pressure is removed and any residual gases under pressure within chambers 120 and 147 are relieved, plug 142 can be safely removed and the positioning of support member 132 can safely be accomplished.

At the opposite end of inlet member 130, a regulator piston 160 is mounted and provided with a central opening 162 which provides communication between the inlet member and pressure control chamber 60. A compression spring 164 is disposed between regulator piston 160 and a spring adjusting disc 166 rotatably supported on cylindrical support member 132. By adjustment of the position of support member 132 in the regulator housing, the position of spring adjusting disc 166 can be varied to adjust the bias exerted by compression spring 164 on regulator piston 160. The regulator piston is provided with a set of three forwardly projecting posts 168 arranged in a circular configuration on the piston face which are movable into engagement with the inner face of outlet fitting 48 to limit the extent of movement available to regulator piston 160 and inlet member 130.

Referring to FIG. 2, flexible diaphragm 62 is normally disposed across central opening 162 in regulator piston 160. Preferably, the flexible diaphragm is adapted to function as a check valve to permit forward flow of pressurized gas from the inlet member into the pressure control chamber and to block reverse flow. Diaphragm 62 includes a set of six holes which are arranged in a circular configuration and extend through the diaphragm. Three of the holes receive posts 168 and serve to retain the diaphragm in a desired position across the face of regulator piston 160. The remaining holes 167 function as valve openings which selectively permit the pressurized gas to flow into the pressure control chamber.

The secondary regulator stage operates as follows. With the gas pressure in pressure control chamber 60 at or above its desired level, the force exerted on regulator piston 160 is sufficient to overcome the bias of compression spring 164 to hold inlet member 130 against elastomeric sealing element 155 to preclude the entry of pressurized gas from secondary inlet chamber 120 into the inlet member. In addition, flexible diaphragm 62 is pressed against the front face of regulator piston 160 to preclude any movement of gas or liquid through the valve openings in the diaphragm. When the gas pressure in pressure control chamber 60 drops below the desired level, regulator piston 160 and tubular inlet member 130 move forwardly under the action of compression spring 164 to disengage the inlet member from its elastomeric sealing element 155 to permit the pressurized gas in secondary inlet chamber 120 to flow into the inlet member. The pressurized gas forces the central postion of diaphragm 62 to bulge outwardly from the face of regulator piston 160 to allow the pressurized gas to flow through valve openings therein into the pressure control chamber. When the pressure in chamber 60 increases to the desired level, regulator piston 160 is moved backward against the action of compression spring 164 to return inlet member 130 into engagement with elastomeric seal element 155 to block the entry of pressurized gas into the inlet member. In addition, diaphragm 62 is pressed into engagement with the face of regulator piston 160 to close valve openings.

In summary, the primary regulator stage functions to reduce the inlet pressure from the gas pressure source to an intermediate level in primary inlet chamber 84 which is supplied to secondary inlet chamber 120. The secondary regulator stage functions to automatically supply pressurized gas from secondary inlet chamber 120 to pressure control chamber 60 to maintain a desired output pressure in the pressure control chamber. In the event of an excess pressure buildup in pressure control chamber 60 to a predetermined level, flexible diaphragm 62 is collapsed to allow the pressurized gas to escape through exhaust vents 46. Once diaphragm 62 is collapsed, it is necessary for experienced personnel to disassemble the regulator to reset or replace the diaphragm. This requirement provides a significant safeguard because it precludes the possibility of any catastrophic failure as a result of attempts by inexperienced operators to reset the pressure regulator.

Furthermore, the primary and secondary regulator stages are advantageously designed to minimize the possibility of catastrophic failure. The complete failure of either regulator stage cannot result in an unsafe situation, unless the failures occur simultaneously and with the secondary regulator stage failed in its fully open position. This circumstance is extremely unlikely simply because of the laws of probability. Since each regulator stage has a theoretical life of billions of cycles and years of time, the possibility of simultaneous failure is extremely remote.

In addition, the pressure regulator is designed to automatically shut down the dispensing system in the event of sequential failures of the regulator stages. For example, if the primary regulator stage fails, exposing the secondary regulator stage to high pressure, the secondary regulator stage will automatically close when the gas pressure in pressure control chamber 60 is at or above its desired level. On the other hand, if the secondary regulator stage fails in its open condition so that the high gas pressure from the primary regulator stage is continuously supplied to pressure control chamber 60, flexible diaphragm 62 is unclamped to release the remaining gas pressure from the source to the atmosphere. Moreover, the exposure of the secondary regulator stage to high pressure freezes tubular inlet member 130 closed to preclude further pressure buildup. Further, if the primary regulator stage fails in its closed condition, i.e., with poppet valve 98 closed, the poppet valve shuts off the source pressure supplied to the pressure regulator. If the primary regulator stage fails in its open condition, the pressurized gas is allowed to escape through vents 114 to preclude excessive pressure buildup.

In conclusion, the present invention provides a pressure reducing regulator which operates safely and effectively to reduce the input pressure from a pressurized gas source to an output pressure at a desired level and automatically maintains the desired output pressure in a dispensing system. The pressure regulator is advantageously designed to accomplish the pressure reduction in two stages which incorporate multiple safety features to minimize the possibility of failure. In addition, the pressure regulator is designed to automatically release the pressurized gas to the atmosphere in the event of excessive pressure buildup to preclude catastrophic failures.

Figure 3:
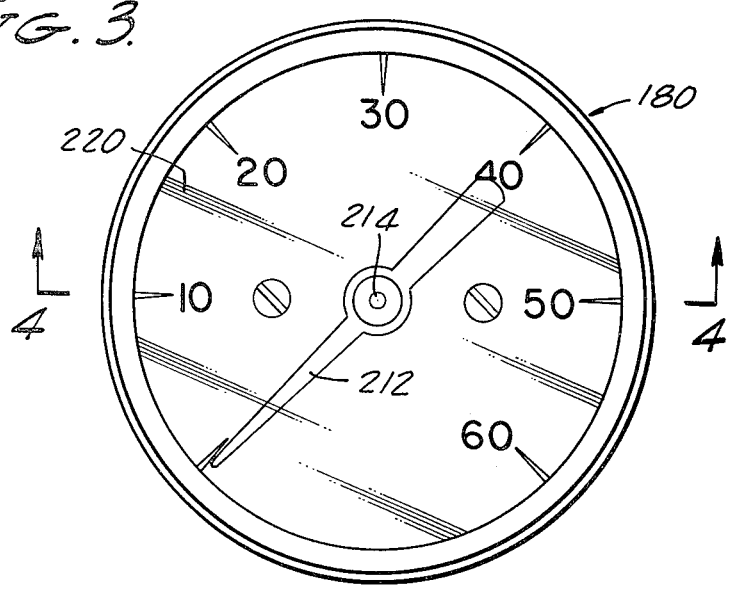
FIG. 3 is a plan view of the safety pressure gage embodiment of the invention.
Figure 4:
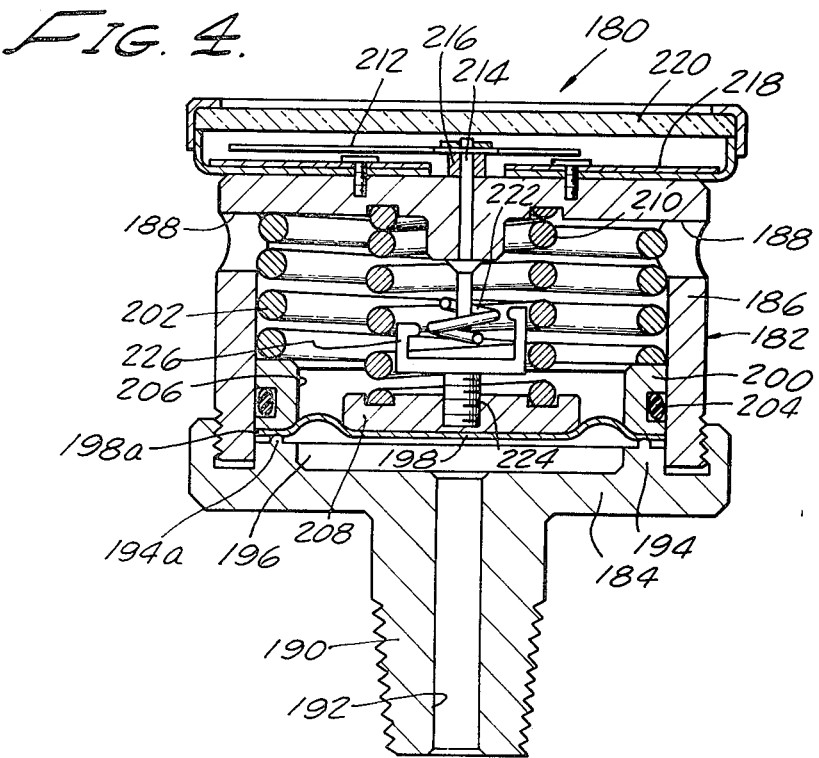
FIG. 4 is a cross-sectional view of the safety pressure gage taken along lines 4—4 of FIG. 3.

Referring now to FIGS. 3 and 4 of the drawings, the safety pressure gage embodiment of the invention is thereshown. As best seen in FIG. 4, the safety releasing diaphragm construction of this form of the invention is very similar to that previously described herein, but is uniquely adapted to a pressure indicating gage assembly generally indicated by the numeral 180. As will become apparent from the description which follows, the device of the invention has all the fail-safe features peculiar to a rupture disc type apparatus and will safely and effectively protect any system upon which it is installed.

As shown in FIG. 4, the apparatus of this form of the invention includes a housing 182 comprising a pressure inlet section or first chamber 184 and a pressure outlet section or second chamber 186. The outlet section of the housing is generally cylindrical and hollow in configuration and is provided with a set of exhaust vents or passageways 188. Pressure inlet section 184, which includes an outwardly projecting nipple 190 provided with an axial passage 192, is adapted to threadably receive cylindrical housing section 186. A source of fluid under pressure may be connected to nipple 190 by any suitable connecting conduit. An inwardly projecting annular flange 194 is provided on inlet section 184 which defines a pressure control chamber 196 in communication with inlet passage 192.

A flexible diaphragm 198, preferably consisting of soft, elastomeric material, is disposed transversely within housing section 186 adjacent to annular flange 194 of the inlet fitting. Diaphragm 198 is circular in configuration and is normally disposed across pressure control chamber 196 to separate the first and second chambers and to seal the pressure control chamber from communication with exhaust vents 186. A cylindrically shaped clamping piston 200 is slidably disposed within housing section 186 and is normally biased by a first biasing means such as a compression spring 202 into engagement with the periphery of flexible diaphragm 198 to clamp the diaphragm against annular flange 194 in its normal position across pressure control chamber 196. A raised, annular ridge 194a is formed on the inner face of annular flange 194 to assist clamping piston 200 in firmly retaining flexible diaphragm 198 in place. Annular ridge 194a serves as a high pressure seal and firmly grips diaphragm 198 in response to the force exerted by compression spring 202. An O-ring seal 204 is mounted in a peripheral notch provided in clamping piston 200 to provide a gas-tight seal between the piston and housing 186. Clamping piston 200 is generally cylindrical in configuration and has a central passage 206 in communication with exhaust vents 188.

Normally, clamping piston 200 under the action of compression spring 202 firmly clamps flexible diaphragm 198 across pressure control chamber 196 to block communication with exhaust vents 188. However, in the event of a malfunction which results in excess pressure buildup in pressure control chamber 196, a force is exerted on diaphragm 198 and transmitted to piston 200 which is sufficeint to overcome the force of compression spring 202 and move the clamping piston upward to unclamp the diaphragm. The excess pressure initially acts on an annular portion of diaphragm 198 and piston 200 limited by ridge 194a. However, once piston 200 is slightly moved, the excess pressure leaks across ridge 194a and acts on the entire piston face to rapidly disengage the piston from the diaphragm. Consequently, a peripheral portion 198a of diaphragm 198 is allowed to collapse into passage 206 to permit pressurized gas to escape from pressure control chamber 196 through exhaust vents 188. In the case of toxic or flammable gas, suitable conduits (not shown) may be connected to vents 188 to direct the gas to a safe disposal area.

The central portion of elastomeric diaphragm 198 bears upwardly against a disc 208 which is centrally disposed within outlet section 186. Central disc 208 in turn bears against a second biasing means or compression spring 210 which is carried within section 186 in coaxial alignment with the vertical axis of the gage. With this construction, fluid pressure admitted to the device via inlet passage 192 will urge the central portion of diaphragm 198 in an upward direction. As the inlet pressure increases, the upward force exerted by the fluid pressure acting on the central portion of the diaphragm and in turn on disc 208, will increase, compressing compression spring 210 and permitting disc 208 to move upward a pre-determined distance in response to a given pressure applied to the inlet of the device.

Operably associated with disc 208, and rotatable in response to upward movement thereof, is an indicating pointer 212 which forms a part of the gage assembly 180. As best seen in FIG. 4, pointer 212 is connected to a downwardly depending, centrally disposed pointer shaft 214 which is carried for rotation within bearings 216 mounted on housing section 186. The gage assembly which includes a casing, or housing mounted on the top of section 186 also comprises a gage face 218 having pressure indication indicia and a transparent protective cover 220.

Conversion of the upward movement of disc 208 into rotational movement of shaft 214 is accomplished by conversion means adapted for this purpose. These conversion means can be provided in various forms depending on the particular application and numerous mechanisms for accomplishing this result are well known to those skilled in the art. However, in the embodiment of the invention shown in the drawings the conversion means are provided in the form of a metal helix 222 carried by shaft 214 and magnetic means carried by a central stub shaft 224 which is threadably connected to disc 208. The magnetic means, shown here in the form of a horseshoe type permanent magnet 226, is positioned in close proximity with helix 222. With this arrangement the poles of magnet 226 attract the helix 222 magnetically in such a way that the helix always aligns itself with the magnet poles. This means that as disc 208 and magnet 226 move up or down, the helix will rotate pointer shaft 214 and pointer 212 clockwise or counterclockwise. The angular pointer position, in conjunction with a calibrated scale is therefore an indication of the pressure applied to the gage inlet. Through proper selection of the spring gradient of spring 210, the gage apparatus can be adapted to read the desired pressure range, as for example 0 to 60 psig as illustrated in FIG. 3. Additionally, the spring gradient of spring 202 can be selected so that if the gage reading exceeds the selected maximum pressure reading by a predetermined amount, for example, ten percent, piston 200 will move upwardly unclamping diaphragm 198 and instantly venting the apparatus to atmosphere.

As was the case in earlier described embodiments of the invention, once the device is vented it will not automatically re-set. Rather, the device must be disassembled by a knowledgable workman using special tools and the diaphragm manually repositioned across pressure chamber 196. This important safety feature insures that the problem which caused the overpressurization will be corrected before the device is once again placed into service.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An improved pressure regulator for disposition between a gas pressure source and a pressure vessel, said pressure regulator being characterized by having a pressure chamber normally sealed by a reusable diaphragm which is collapsible under abnormally high pressure conditions within the pressure chamber and which, for reasons of safety is only manually resetable, said pressure regulator comprising:
 (a) a housing provided with a pressure control chamber therein and one or more vents to release excess pressure from said pressure control chamber;
 (b) inlet means for supplying pressurized gas from said gas pressure source to said pressure control chamber, said inlet means comprising:
  (1) a primary regulator stage for receiving pressurized gas from said source and reducing the gas pressure to an intermediate level; and
  (2) a secondary regulator stage adapted to selectively provide communication between said first regulator stage and said pressure control chamber for maintaining a desired gas pressure therein, said secondary regulator stage including:
   a. adjustment means carried interiorly of said housing for selectively varying the outlet pressure in said control chamber; and
   b. safety means removably carried by said housing for blocking access to said adjustment means, said safety means including valve means for automatically venting pressurized gas from said source to atmosphere upon attempted removal of said safety means from said housing;

c. outlet means in communication with said pressure control chamber for supplying the pressurized gas to said pressure vessel;

d. a flexible diaphragm disposed within said housing for normally sealing said pressure control chamber from communication with said vents;

e. a clamping piston slidably disposed within said housing for movement between a first position and a second position and provided with a central passage in communication with said vents, said piston being normally adapted at said first position to clamp said diaphragm at its periphery and retain said diaphragm in place over said passage to preclude gas flow therethrough; and f. bias means for normally urging said piston into clamping engagement with said diaphragm, said piston being movable against the action of said bias means upon an increase of the gas pressure in said pressure control chamber above a predetermined level to unclamp said diaphragm and allow said diaphragm to collapse into said central passage to permit the gas to escape from said pressure control chamber through said vents.

2. An improved pressure regulator as defined in claim 1 in which said adjustment means includes a support member threadably carried interiorly of said housing, said support member having a wrench engaging portion proximate one end thereof; and in which said safety means comprises a hollow plug assembly including said valve means, threadably received within an axial passageway provided in said housing and being removable therefrom to provide access to said wrench engaging portion of said support member.

3. An improved pressure regulator as defined in claim 2 in which said hollow plug assembly comprises:
(a) an externally threaded plug having an interior pressure chamber in communication with said gas pressure source when said plug assembly is threadably received within said axial passageway;
(b) a wrench engaging aperture formed proximate one end of said plug;
(c) a passageway interconnecting said wrench engaging aperture and said interior pressure chamber; and
(d) a valve means comprising valve assembly carried by said plug for controlling the flow of gases from said chamber through said passageway.

4. An improved pressure regulator as defined in claim 3 in which said valve assembly comprises:
(a) a body portion disposed within said interior pressure chamber;
(b) a valve stem portion formed integrally with said body, said stem portion extending through said passageway and into said wrench engaging aperture; and
(c) sealing means disposed within said chamber for sealably engaging said body portion and said stem portion to prevent the flow of gases through said passageway.

5. An improved pressure regulator for disposition between a gas pressure source and a pressure vessel, said pressure regulator being characterized by having a pressure chamber normally sealed by a reusable diaphragm which is collapsible under abnormally high pressure conditions within the pressure chamber and which, for reasons of safety is only manually resetable, said pressure regulator comprising:

(a) a housing provided with a pressure control chamber therein and one or more vents to release excess pressure from said pressure control chamber;

(b) inlet means for supplying presurized gas from said gas pressure source to said pressure control chamber, said inlet means comprising:
 (1) a primary regulator stage for receiving pressurized gas from said source and reducing the gas pressure to an intermediate level; and
 (2) a secondary regulator stage adapted to selectively provide communication between said first regulator stage and said pressure control chamber for maintaining a desired gas pressure therein, said secondary regulator stage comprising:
  a. a secondary inlet chamber formed in said housing for receiving pressurized gas from said primary regulator stage;
  b. a tubular inlet member slidably mounted within said housing and extending from said secondary inlet chamber through said central passage in said clamping piston to said pressure control chamber;
  c. sealing means located in said secondary chamber in a position to engage said inlet member to block gas flow into said pressure control chamber;
  d. bias means associated with said inlet member for yieldably exerting a force on said inlet member in a direction away from said sealing means, said inlet member being responsive to the gas pressure in said pressure control chamber to move into engagement with said sealing means against the urging of said bias means when the pressure in said pressure control chamber exceeds a predetermined level;
  e. bias adjusting means carried interiorly of said housing and associated with said bias means for adjusting the amount of force exerted by said bias means on said inlet member; and
  f. safety means removably carried by said housing for blocking access to said bias adjusting means, said safety means including valve means for automatically venting pressurized gas from said source to atmosphere upon attempted removal of said safety means from said housing;

(c) outlet means in communication with said pressure control chamber for supplying the pressurized gas to said pressure vessel;

(d) a flexible diaphragm disposed within said housing for normally sealing said pressure control chamber from communication with said vents;

(e) a clamping piston slidably disposed within said housing for movement between a first position and a second position and provided with a central passage in communication with said vents, said piston being normally adapted at said first position to clamp said diaphragm at its periphery and retain said diaphragm in place over said passage to preclude gas flow therethrough; and (f) bias means for normally urging said piston into clamping engagement with said diaphragm, said piston being movable against the action of said bias means upon an increase of the gas pressure in said pressure control chamber above a predetermined level to unclamp said diaphragm and allow said diaphragm to collapse into said central passage to permit the gas to escape from said pressure control chamber through said vents.

* * * * *